United States Patent [19]

Eymann et al.

[11] 4,282,524
[45] Aug. 4, 1981

[54] LINEAR BESSEL RANGING RADAR

[75] Inventors: Steven W. Eymann, Tempe; Mark A. Fried; Thomas L. Harris, both of Scottsdale, all of Ariz.

[73] Assignee: Motorola Inc., Schaumburg, Ill.

[21] Appl. No.: 971,160

[22] Filed: Dec. 20, 1978

[51] Int. Cl.³ .............................................. G01S 13/32
[52] U.S. Cl. ..................................... 343/14; 343/7 PF
[58] Field of Search ................................ 343/7 PF, 14

[56] References Cited

U.S. PATENT DOCUMENTS

| | | | |
|---|---|---|---|
| 3,789,398 | 1/1974 | Erst | 343/14 |
| 3,823,399 | 7/1974 | Yamanaka | 343/14 |
| 3,992,711 | 11/1976 | Stoakes | 343/14 X |
| 4,040,357 | 8/1977 | Saunders | 343/14 X |

Primary Examiner—T. H. Tubbesing

[57] ABSTRACT

A narrow band CW FM fixed height altimeter system utilizing linear Bessel function signal processing wherein a $J_0$ and a $J_1$ Bessel function signal component are compared in a biased comparator to yield an output signal at a predetermined, relatively low altitude. The system provides a very small, accurate, low cost solution to the problem of identifying a very low and predetermined altitude.

7 Claims, 8 Drawing Figures

-PRIOR ART-

Fig 1

-PRIOR ART-

LINEAR BESSEL RANGING RADAR

FIELD OF THE INVENTION

The invention relates to a system for sensing a predetermined amplitude difference in the $J_0$ and $J_1$ Bessel function signal components in the demodulated received signal of a CW FM radar system for establishing a predetermined, relatively low altitude of the sensing system.

BACKGROUND OF THE INVENTION

CW FM radar systems are disclosed in the prior art. For example, the Bessel function distribution of the demodulated frequency component distribution and a method for indicating range as a function of the amplitude ratio of two sequentially ordered Bessel functions is disclosed in U.S. Pat. No. 2,453,169 by Varian. Yamauaka, et al, U.S. Pat. No. 3,872,475 discloses a method of ranging depending upon a time delay between equal levels of $J_0$ and $J_1$ (Bessel) terms. Other systems in the prior art use wide band FM modulation to accomplish satisfactory system accuracy.

The systems of the prior art are generally complex and therefore expensive and suffer from a lack of accuracy to a great degree.

SUMMARY OF THE INVENTION

The present invention provides a small, low cost CW FM radar system having accuracy at relatively low ranges, on the order of ±20% of the nominal detection range, worse case, good noise immunity to both environmental and purposely generated noise signals and a simple, reliable circuit configuration, very suitable for adaptation to integrated circuit manufacturing processes.

It is therefore an object of the invention to provide good short range accuracy in a narrow band CW FM radar system.

It is another object of the invention to provide a CW FM radar system with good R-F interference immunity.

It is still another object of the invention to provide a compact low cost CW FM radar for detection of radar targets at a predetermined relatively short range.

These and other objects of the invention will become more clearly understood upon study of the detailed description of the invention, below, and the drawings in which:

DETAILED DESCRIPTION OF THE INVENTION

While the invention of this disclosure may be used to satisfy any relatively short range system requirement such as terrain avoidance, collision avoidance or any other near range warning system requirement, the embodiment described hereinafter is optimized for a low altitude fuzing application. The optimization is with respect to range accuracy, rejection of range ambiguities, implementation size and cost, and external and mutual interference immunity.

A source of confusion involved in the understanding of systems such as the one to be described, infra, comes from the frequent misconception of the terms "range accuracy" and "range resolution". Range accuracy deals with the precision with which the range to the target is measured and range resolution denotes the ability to distinguish between closely spaced targets. For conventional radars, range resolution implies a necessary modulation bandwidth corresponding to $C/2R$, where:

C is the speed of light

R is the distance between the targets to be resolved

However, no minimum bandwidth is implied by the term range accuracy. The instant system implementation has a very narrow radiated bandwidth providing excellent range accuracy and poor range resolution. This is a very acceptable situation considering the surface approach fuzing application effectively involves only one target, the ground, and other implementations are concerned only with the nearest target. It is implied that the radar parameters are chosen such that the ground return at or near normal incidence, that is; the nearest target, dominates.

The Mathematics

Figure 1:
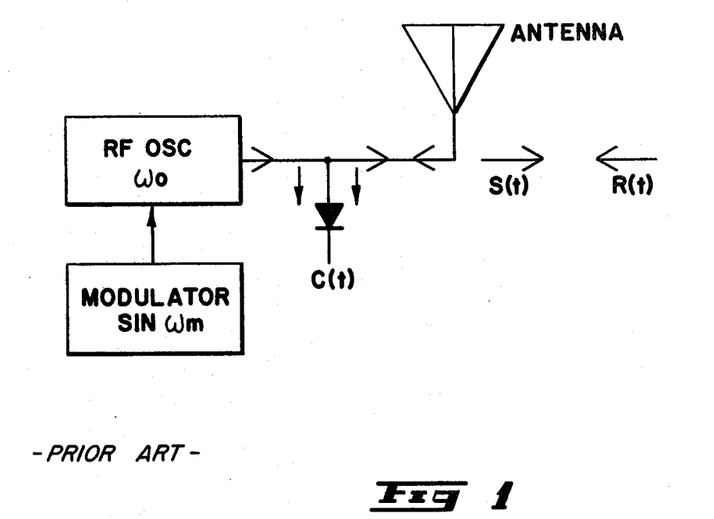
FIG. 1 is a simplified block diagram of a typical prior art CW FM radar.

A simple sinusoidally phase modulated radar signal is transmitted with the form:

$$S(t) = \cos[\omega_0 t + (\Delta\omega/\omega_m)\sin\omega_m t]$$

where:

$\omega_0$ = carrier radian frequency $\Delta\omega$ = one sided RMS frequency deviation radian frequency $\omega_m$ = modulation radian frequency, see FIG. 1.

The radar return signal from a moving target is of the form:

$$R(t) = A\cos[\omega_0(t-\tau) + (\Delta\omega/\omega_m)\sin\omega_m(t-\tau)]$$

where:

$\tau$ is the radar target delay = $2/C [R_0 \pm V_r(t-t_0)]$;

A represents path loss factor $R_0$ is the distance between radar and target at $t = t_0$ $V_r$ is the target relative velocity (−approaching, + receding).

R (t) may then be expressed as:

$$R(t) = A\cos[(\omega_0 \pm \omega_d)t - \phi_0 + (\Delta\omega/\omega_m)\sin\omega_m(1\pm(2V_r/C))t - \phi_m]$$

where:

$\omega_d$ = doppler displacement radian frequency $\phi_0 = (2\omega_0 R_0/C) \pm (\omega_d t_0)$ $\phi_m = (2\omega_m R_0/C) \pm (2\omega_m V_r t_0/C)$.

The difference frequency signal obtained by heterodyning the returned signal with the transmitted reference signal (leakage) may be expanded in a trigonometric series whose terms are the harmonics of the modulating frequency $f_m$. This series is of the form:

$$C(t) = J_0(Z) \cos(\omega_d t - \phi_0) + 2J_1(Z) \sin(\omega_d t - \phi_0) \cos(\omega_m t - \phi_m) - 2J_2(Z) \cos(\omega_d t - \phi_0) \cos 2(\omega_m t - \phi_m) - 2J_3(Z) \cos(\omega_d t - \phi_0) \cos 3(\omega_m t - \phi_m) + \ldots$$

where:

$$Z = (2\Delta\omega/\omega_m) \sin(\omega_m R_0/C).$$

Figure 2:
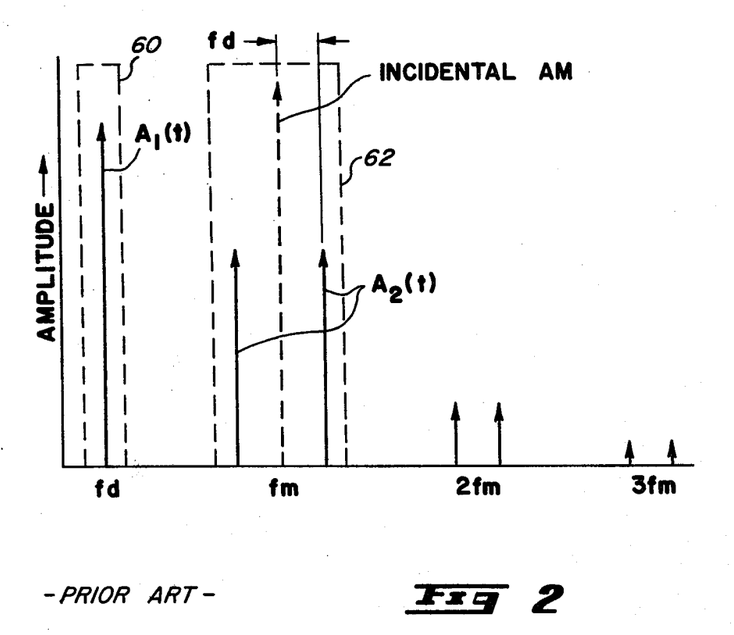
FIG. 2 is an illustration, in graph form, of the spectrum of the FIG. 1 mixer output.

Thus, the difference frequency signal consists of a Doppler frequency component of amplitude $J_0(Z)$ and a series of cosine waves of frequency $f_m$, $2f_m$, $3f_m$, etc. Each of these harmonics of $f_m$ is modulated by a Doppler frequency component with amplitude proportional to $J_n(Z)$. The product of the Doppler frequency factor times the nth harmonic factor is equivalent to a suppressed carrier double sideband modulation as shown in FIG. 2.

The system of the invention utilizes the first two terms of this series and the necessary modulation parameters are optimized for this purpose. The first term at the Doppler frequency is of the form:

$$A_1(t) = (A/2) J_0[(2\Delta\omega/\omega_m) \sin(\omega_m R_0/C)] \cos(\omega_d t - \phi_0)$$

and the second term, the suppressed carrier, double sideband component is:

$$A_2(t) = 2A J_1[(2\Delta\omega/\omega_m) \sin(\omega_m R_0/C)] \sin(\omega_d t - \phi_0) \cos(\omega_m t - \phi_m).$$

See FIG. 2.

While the second term is centered at $f_m$, the double sidebands can be further demodulated after separation from other harmonics of $f_m$. This is done by heterodyning with the locally available waveform $\cos(2\pi f_m t)$ (incidental AM) to translate the frequency to baseband Doppler as the term:

$$A_2^*(t) = (A/2) J_1[(2\Delta\omega/\omega_m) \sin(\omega_m R_0/C)] \sin(\omega_d t - \phi_0 - \phi_m)$$

where $A^*(t)$ is the demodulated $A_2(t)$ term.

The range discrimination of this system is based on using the ratio of the peak amplitude of the $A_1(t)$ and $A_2^*(t)$, Doppler waveforms, expressed as follows:

$$(A_1(t)\max / A_2^*(t)\max) = (J_0(Z)/2J_1(Z))$$

It is noted that the above ratio compares the 1st order and zero order Bessel functions whose arguments are a function of range. Also, the two Doppler waveforms are displaced in phase by $\pi/2$ radians.

Figure 3:
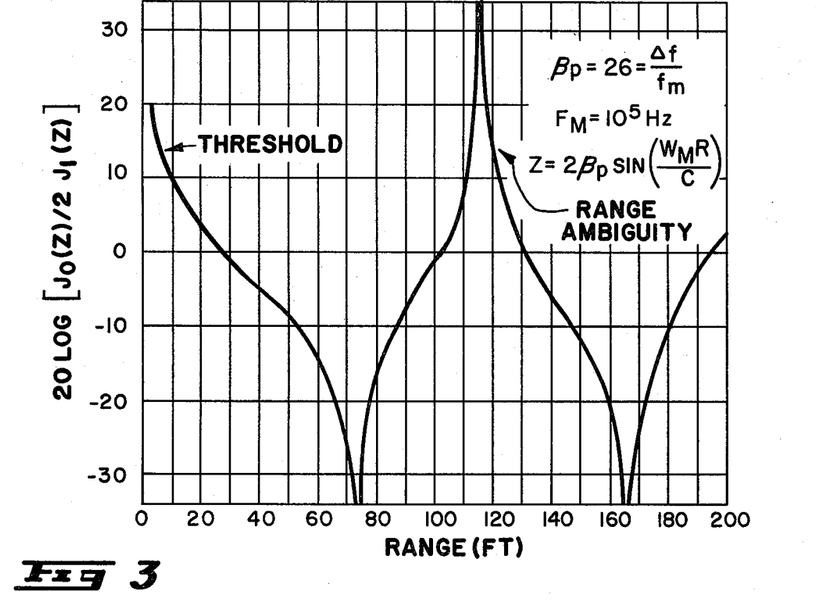
FIG. 3 is an illustration, in graph form, of the range response of a typical system of the invention.
Figure 4:
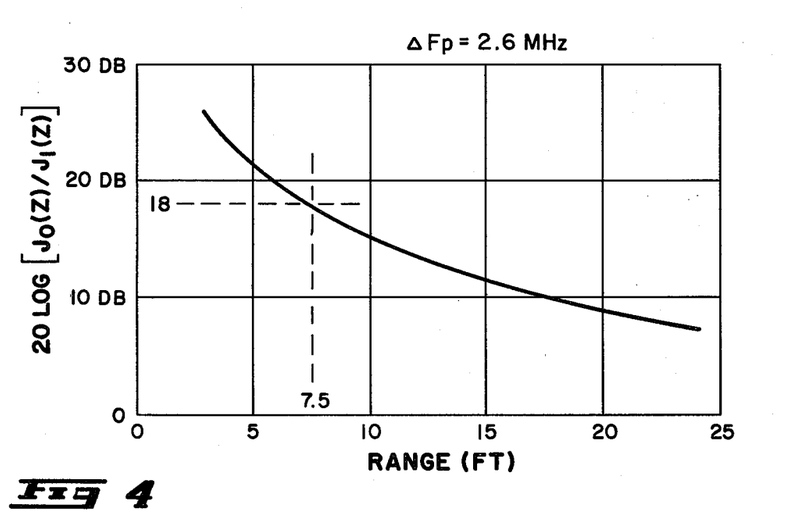
FIG. 4 is an expanded portion of the graph of FIG. 3.

FIG. 3 is a plot of the logarithm of the above ratio vs. range. FIG. 4 is an expanded plot of this ratio for short ranges. The specific modulation parameters shown in these plots were optimized for a 7.5 ft. detection range for the purposes of illustration of one embodiment of the invention. It will be clear to one skilled in this art that any relatively short range may be predetermined in accordance with specific system requirements.

Block Diagram Explanation

Figure 6:
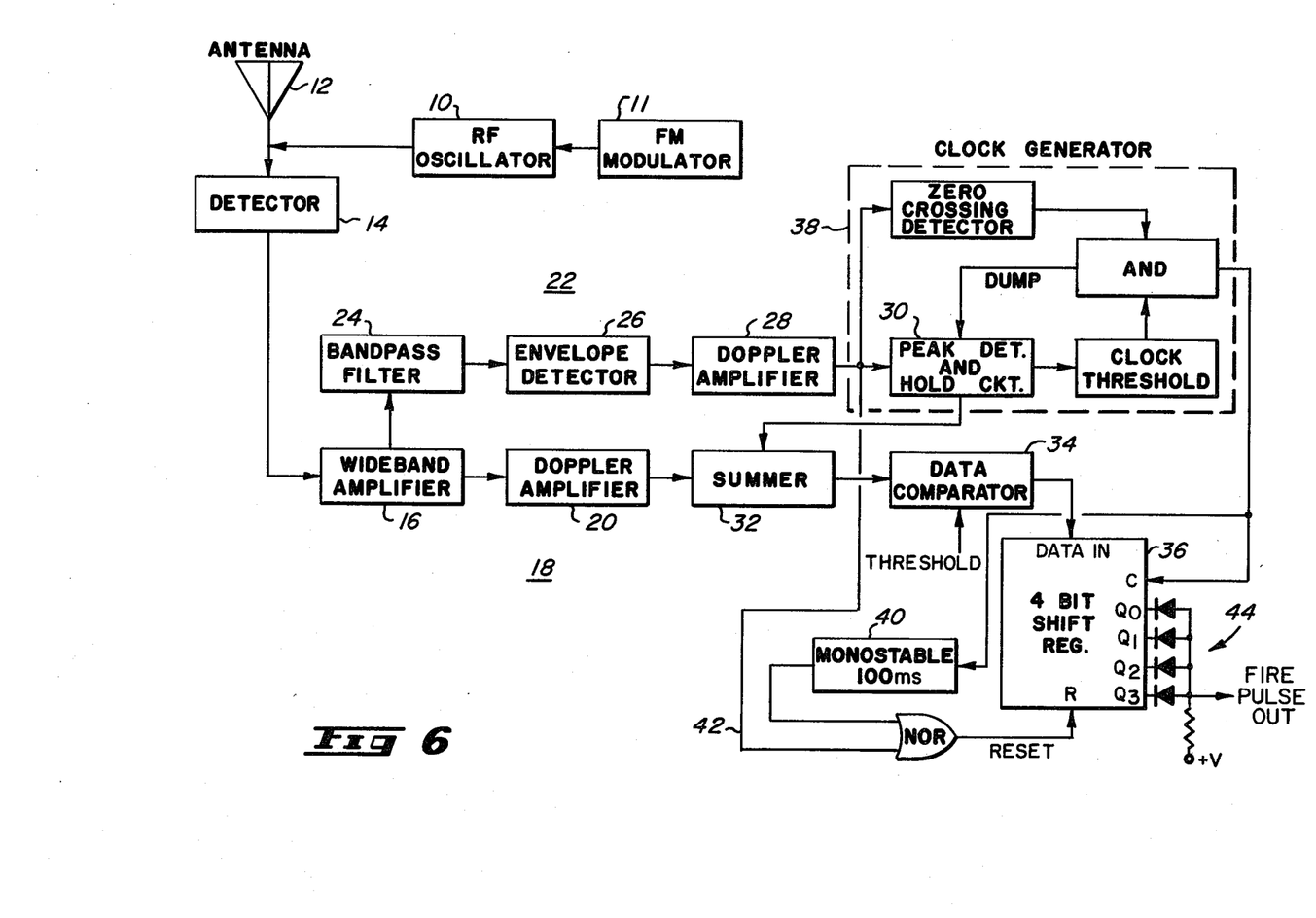
FIG. 6 is a block diagram of a preferred embodiment of the invention.

The block diagram for a sensor configured to detect a preset altitude of 7.5 ft. above the ground with a height of burst (HOB) of 5 ft. is shown in FIG. 6.

For this application, particular illustrative RF oscillator 10 is frequency modulated by modulator 11 to product an RMS frequency deviation (one sided) of 2.6 MHz with a modulation frequency of 100 KHz (a modulation index of 26). This choice of modulation parameters produces the range response as shown in FIGS. 3 and 4. It should be noted that the response is reasonably linear over the range of interest around 7.5 ft. See, especially, FIG. 4.

Mutual antenna 12 is used for both transmitting and receiving. Transmitter to receiver leakage supplies the local oscillator reference signal to first mixer or detector 14 where it is heterodyned with the received signal.

Mixer 14 is followed by wideband linear amplifier 16 with sufficient bandwidth, approximately 150 KHz, to pass the baseband Doppler signal (the $J_0(Z)$ term) and the two Doppler sidebands (the $J_1(Z)$ terms) that are symmetrically displaced around the modulation frequency (100 KHz). The higher order Bessel terms are not pertinent to this system and therefore, can be rejected at this point. For a practical system the fundamental $f_m$ frequency is also present at the output of the mixer due to unavoidable incidental amplitude modulation of the RF oscillator. This $f_m$ term resulting from incidental modulation is used in this system to simplify the demodulation of the $J_1$ sidebands. Wideband amplifier 16 provides a significant portion of the entire signal gain for both the $J_0$ and $J_1$ terms so that the effect of gain unbalance between the two processing channels is minimized.

The signal output of wideband amplifier 16 is divided into two processing channels in which the $J_0$ and $J_1$ components are separately processed. Channel 18 shown in FIG. 6 is designed to accept only the baseband Doppler component (the $J_0$ term). Doppler filter 20, is therefore, a fairly narrow bandpass filter having, for example, a bandwidth of 1 KHz. This may be seen graphically at 60, FIG. 2.

Wideband amplifier 16 output is similarly applied to $J_1$ processing channel 22. The two $J_1$ signal sidebands are passed through bandpass filter 24 (centered at 100 KHz in this example) designed to reject all higher frequency harmonic terms as well as the baseband Doppler signal ($J_0$ term). This may be seen graphically at 62, FIG. 2. Also passing through filter 24 is a strong signal at the modulation frequency due to the incidental AM. Because of the short target ranges involved in this application, the incidental AM signal is virtually phase coherent with the $J_1$ sidebands signal return. This creates the fortuitous situation where the double sideband suppressed carrier signal in combination with the incidental AM can be treated as a "pseudo" AM signal (with the incidental AM representing the carrier). In this manner, the $J_1$ term is demodulated as an AM signal by simple envelope detection in detector 26. This simple demodulation will be valid as long as the amplitude of the incidental AM (pseudo-carrier) is at least 4 dB greater than the maximum target signal sidebands (the upper limit for the AM would be the amplitude where saturation effects begin). The demodulation translates the sidebands to a baseband Doppler signal. Doppler filter 28 has the same filtering characteristics as Doppler filter 20, supra.

While it has been shown, above, that the range can be measured by taking the ratio of the maximum amplitudes of $J_0(Z)$ and $J_1(Z)$ terms, it is possible to derive further signal processing simplifications by taking advantage of the particular application of the system. In the fuzing application, the range to the target need not be tracked; only one detection range is of interest. The curves of FIGS. 3 and 4 show that a detection range of 7.5 ft., the maximum amplitude of the $J_0$ term will exceed the $J_1$ term by 18 dB. The channel gains are adjusted so that the gain of the $J_1$ channel is 18 dB greater than that of the $J_0$ channel, then the $J_1$ channel output exceeds that of the $J_0$ channel for target ranges greater than 7.5 ft. The situation is reversed for ranges less than 7.5 ft. The gain of Doppler amplifiers 20 and 28 are designed and adjusted to provide this 18 dB difference. A simple linear comparator 34 senses the range at which the maximum amplitude of the $J_0$ channel begins to exceed that of the $J_1$ channel. This occurs at the predetermined desired detection range of 7.5 ft.

Figure 5:
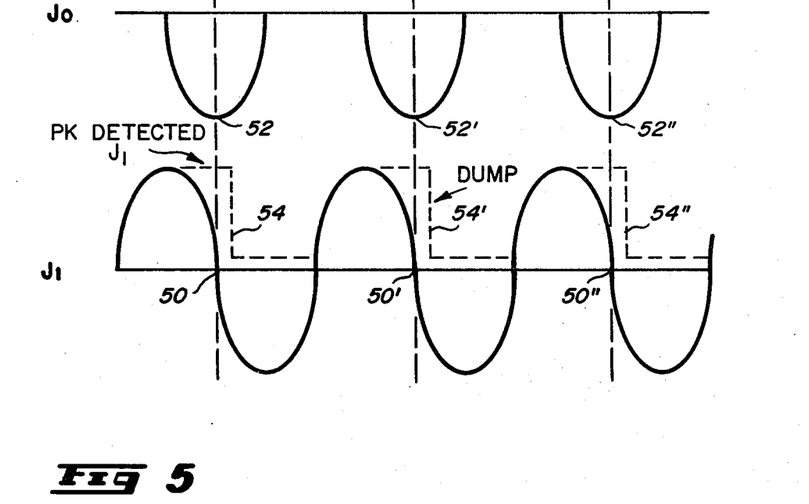
FIG. 5 shows, in graph form, typical waveform time relationships in a preferred embodiment of the invention.

The processing scheme described above must compare the maximum amplitude of both the $J_0$ and $J_1$ Doppler waveforms. It has been shown, however, that these Doppler waveform maximums are displaced in phase by 90°. The $J_1$ waveform is, therefore, peak detected by peak detection and hold circuit 30, part of clock generator 38, and the value is held until the maximum of the $J_0$ waveform occurs; at which time the comparison is made in summer 32. The comparison time is triggered by zero crossings 50 of the $J_1$ waveform which should occur simultaneously with $J_0$ maximums 52, see FIG. 5. Immediately after this comparison is sampled, $J_1$ waveform peak detector 30 is discharged or dumped 54; allowing for an independent amplitude comparison every Doppler cycle. These events are shown in time relationship by the waveforms of FIG. 5.

A stated, above, the $J_0$ waveform will exceed that of $J_1$ only for target ranges below 7.5 ft. in this illustrative example. Therefore, as the fuze approaches the ground comparator 34 output will remain "0" until the detection range of 7.5 ft. or less where it will become "1".

The integration of comparator 34 output is accomplished with static shift register 36. The data channel accepts comparator 34 outputs which are sampled or clocked into register 36 at the zero crossings of the $J_1$ waveform. A total of 4 consecutive comparator 34 "1" outputs are required for a shift register output. Thus, integration is for a total of 4 Doppler cycles. This 4 cycle integration time represents a fixed range offset of approximately 2.5 ft. (which is independent of Doppler velocity) for an RF carrier frequency of 750 MHz. Thus, the HOB will be at 5 ft. corresponding to a depression of 2.5 ft. from the initial detection range of 7.5 ft.

Several other logical processing decisions involving the resetting of shift register 36 are made in this system to protect against noise, countermeasures signals and range ambiguities. The total signal processing requirements are summarized below and further explained in the sections on range ambiguities and interference protection, infra:

(a) The peak amplitude of the $J_0$ channel output must exceed that of the $J_1$ channel by at least 75 mV. (Threshold setting into comparator 34.)

(b) The peak amplitude of the $J_1$ channel output must exceed clock generator 38 threshold of 390 mV.

(c) Conditions (a) and (b) must be satisfied simultaneously ("1" entered into register 36) for 4 consecutive Doppler cycles.

(d) The time between clock pulse inputs to register 36 shall not exceed 100 ms or register 36 will be reset by one shot flip-flop timer 40.

(e) The output of both channels must be approximately 90° out of phase for maximum sensitivity (or clocking will occur at other than the $J_0$ maximum).

(f) Only approaching targets produce the correct 90° phase shift between $J_0$ and $j_1$. Hence, the system incorporates directional Doppler processing.

Figure 7:
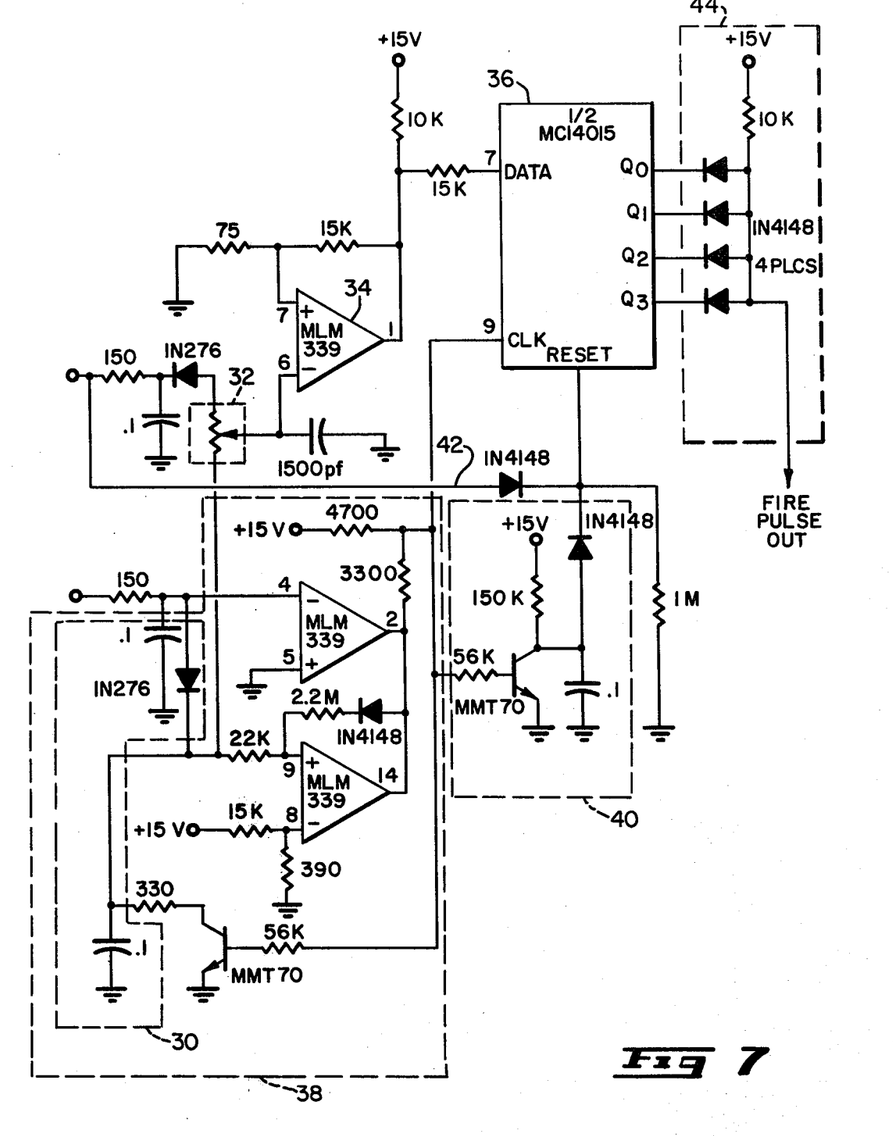
FIG. 7 is a partial schematic diagram of a preferred embodiment of the invention, based on the block diagram of FIG. 6.

A partial schematic diagram of summer 32, clock generator 38, data comparator 34, register 36 and associated circuits is shown in FIG. 7. The salient parameters of the system are listed below:

RF Frequency—750 MHz
RF Power Output—24 mW
RMS Frequency Deviation—2.6 MHz
Modulation Frequency—100 KHz
Wideband Amplifier Gain—36 dB
Bandwidth of $J_1$ Filter—12 KHz
Gain of $J_1$ Filter—1 dB
Bandwidth of Doppler Filters—1 KHz
Gain of $J_0$ Doppler Filter—18 dB
Gain of $J_1$ Doppler Filter—36 dB
S/N of Both Channels at 57 dB Loop Loss—>40 dB
Data Comparator Threshold—75 mV
Clock Channel Threshold—390 mV

Range Ambiguities

The preferred system detects a 7.5 ft. range by measuring an 18 dB $J_0/2J_1$ ratio. However, FIG. 3 shows that this 18 dB ratio also repeats at approximately 118 ft. and various intervals beyond. A discrimination technique is used that can distinguish a minimum reflectivity target at 7.5 ft. from a maximum target at 118 ft.

Figure 8:
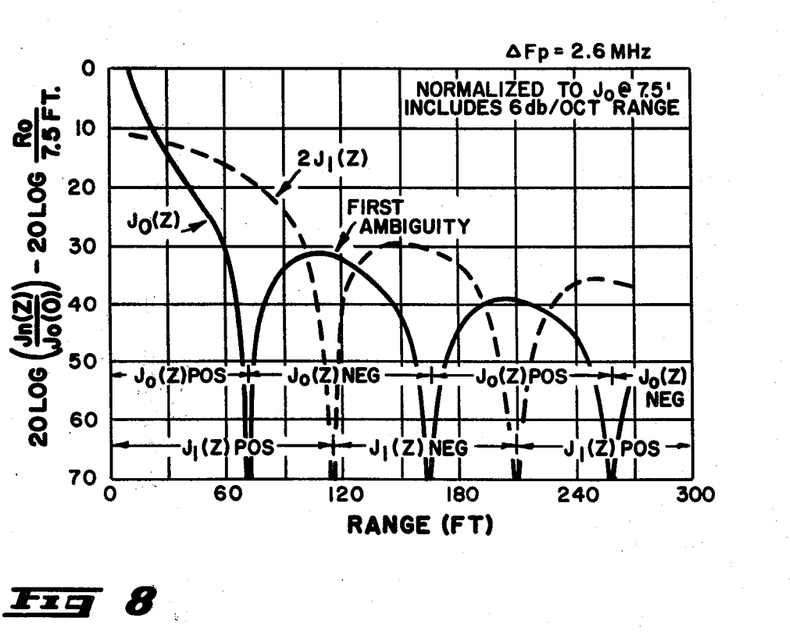
FIG. 8 shows, in graph form, the range response, including the potential range ambiguity, of the system of the invention.

FIG. 8 shows a plot of the $J_0(Z)$ and $2J_1(Z)$ terms (normalized to $J_0$ (7.5 ft.)) versus range. The effect of a nominal 6 dB/octave of range increase is included in these curves to represent the effect of path loss versus range. This shows that the amplitude of the $J_1$ term at the detection range (7.5 ft.) is greater than 30 dB larger than the amplitude at the first ambiguity (118 ft.). A very conservative estimate for the variation in target reflectivities from maximum to minimum terrain reflectivity is 16 dB. This provides a 14 dB range of threshold levels that can be placed in the $J_1$ channel to reject ambiguities. For the preferred system embodiment, a clock threshold is chosen to be approximately 4 dB below the value of the $J_1$ signal resulting from a minimum reflectivity target at 7.5 ft.

Interference Rejection Performance

A basic philosophy has been used in this design that can be stated as follows:

Prevent firing on interfering signals (trade-off desensitization if necessary). At the prescribed detection altitude (i.e. 7.5 ft.), the amount of power that can be delivered at the system antenna by a ground based interference source is limited by line-of-sight and multi-path interference.

Utilizing the above philosophy, the first related task would be to design the system of the invention to afford maximum protection against false functioning due to interfering signals. The results of testing the system showed that the sensor will not fire when subjected to in-band and out-of-band cw, AM cw (sinusoidally modulated in the Doppler band), mutual interference and noise modulated interference sources to a tested power level of at least +5 dBm. The fundamental rejection mechanisms by which the system can discriminate against these signals is summarized as follows:

(1) An interfering signal can form heterodyned products with the spectral lines of the transmitted signal. For example, a cw signal forming a beat frequency of 1 KHz with a transmitter line will also form beats of 101 and 99 KHz with the adjacent lines. Therefore, these products appear in both processing channels 18 and 22. The products formed in both channels 18 and 22 tend to have nearly equal amplitudes resulting from similar conversion efficiencies. However, as disclosed above, the gain of $J_1$ channel 22 is approximately 18 dB greater than that of $J_0$ channel 18. Thus, the $J_1$ output resulting from beat products is significantly greater that that of $J_0$ channel 18 so that only "0's" are clocked into register 36.

(2) The heterodyned products formed in both channels 18 and 22 are either in phase or out of phase (180°) and do not satisfy the 90° phase requirements.

(3) Amplitude modulated interference sources can be envelope detected by the mixer 14 and will tend to appear in either one channel or the other depending on the modulation frequency; but not both. This will not satisfy the necessary two channel logic.

(4) The radiated bandwidth is only 5.2 MHz wide and the power is spread into 52 harmonic lines.

(5) A minimum clock threshold must be crossed.

(6) The general integration requiring clocking in 4 "1's" during a maximum time limit without clocking in a "0" affords added interference protection.

There are some limitations in the system as described which may be overcome by reasonable changes in the described design. For example, the system, as described processes each Doppler cycle so that it effectively measures HOB in 0.7 ft. increments. By processing each half cycle using a full wave rectifier scheme, the increment would be reduced to 0.35 ft. Under conditions where either noise or phase distortion causes the system to miss a threshold crossing, instead of integrating 4 more consecutive crossings in 4×0.7 ft.=2.8 ft. the full wave configuration would require only 4×0.35 ft.=1.4 ft. The system would then recover from skipped crossings in half the distance because it would process the Doppler return at twice the original rate.

A second improvement would provide a better response in the presence of complex targets. Rather than demanding 4 consecutive threshold crossings to detect HOB the system would require 3 out of 4 or 4 out of 5 threshold crossings. This would allow the system to skip a threshold crossing but still require a sufficient number of threshold crossings to identify a real target.

Another system variation would involve processing the true $J_0/J_1$ ratio rather than measuring when the $J_0$ and $J_1$ difference exceeds threshold. This would make the system insensitive to changes in signal strength since the ratio is not affected by amplitude variations. Incorporating a ratio measurement does pose some tradeoffs. The added circuit complexity must be compared more closely with the present difference processing which now only produces a +0.65 ft. HOB error over a 19 dB variation in reflectivity.

Integrated Circuit Implementation

The system may be divided into two major blocks according to the operating frequencies of those blocks. First, in the Signal Processor only the low frequency components from the Radio Frequency Oscillator (RFO) Assembly that are below 200 KHz are accepted for processing. The Signal Processor ultimately produces a fire pulse or target detection indication when the proper return signature is detected. Second, the RFO Assembly is a transmitter/receiver containing an FM oscillator and a detector to demodulate the return signal to baseband.

1. Signal Processor

The Signal Processor must provide the linear functions of gain and filtering, and it must also contain detectors, comparators and logic circuitry to accomplish target detection. To place such a variety of circuit functions on a single IC, requires the selection of a technology having sufficient diversity to adapt to both analog and digital functions. Bipolar circuit technology is amenable to both logic and analog functions as evidenced by the large number of bipolar linear and logic IC's commercially available. The tradeoff to consider, is that a technology optimized for linear circuit performance may be less than optimum for logic elements. However, in the system of the invention, the combination of low circuit complexity, relatively low frequency of operation and reasonable gain requirements make the bipolar circuit technology a logical choice for integrating the Signal Processor into a single IC.

The blocks in the Signal Processor are partitioned into several areas according to the functional type requirements. The modulator, wideband amplifier, bandpass filter, and Doppler filter/amplifier as well as the voltage regulators are all linear functions well suited to linear bipolar design techniques. The main concern for these is to maintain gain and offset tracking between the $J_0(Z)$ and $J_1(Z)$ channels because any imbalance between the channels results in range errors. Drift in the wideband amplifier causes no errors since it is common mode to both channels, and errors due to voltage regulator changes can be minimized by proper design. The peak detector and comparators form a type of A/D interface between the linear circuitry and the processing logic. These circuits can be designed to have the proper thresholds and to operate with sufficient speed to minimize phase errors. The processing logic consists of a few logic gates and a 4 bit shift register which can be constructed using standard logic structures since only low speed is required. Alternately, $I^2L$ structures might prove more applicable to the logic in order to minimize circuit density and aid interfacing with the comparators.

2. RFO Assembly

The RF head for the system must include an RF oscillator capable of being FM modulated and contain a detector to demodulate the return signal. Implementation of these functions in a second integrated circuit chip is felt to be well within the current state of the art.

The foregoing suggestions for integration of the circuits of the system of the invention on two integrated circuit chips appears to be well within the scope of the present state of the integrated circuit art.

This completes the description of the invention. While the invention has been particularly shown and described with reference to a preferred embodiment thereof, it will be understood by those skilled in the art that various other modifications and changes may be made to the present invention from the principles of the invention described above without departing from the spirit and scope thereof, as encompassed in the accompanying claims. Therefore, it is intended in the appended claims to cover all such equivalent variations as come within the scope of the invention as described.

We claim:

1. In a continuous wave frequency modulated radar for fixed short distance ranging wherein a demodulated signal thereof comprises at least $J_0$ and $J_1$ Bessel function signal terms, a signal processing system comprising:
    first channel means for filtering and amplifying one of the $J_0$ and $J_1$ terms;
    second channel means for filtering and amplifying another of the $J_0$ and $J_1$ terms, the amplification factor of said second channel means exceeding the amplification factor of said first channel means by a ratio corresponding to an amplitude ratio between said Bessel function terms at a preselected ranging distance;
    means for sensing and holding a peak value of said another of said $J_0$ and $J_1$ terms to correspond in time to the time at which said one of the $J_0$ and $J_1$ terms reaches a peak value; and
    comparing means for determining when said peak value of said another of the $J_0$ and $J_1$ terms is at least equal to said peak value of said one of the $J_0$ and $J_1$ terms and for generating an output signal responsive to said at least equal relationship.

2. The system according to claim 1, wherein said means for sensing and holding comprises a clock generator, said clock generator being responsive to a threshold crossing of said second channel filtered and amplified signal, said threshold crossing being predetermined to be coincident with said peak of said first channel filtered and amplified signal.

3. The system according to claim 1, wherein said means for sensing and holding comprises a clock generator, said clock generator being responsive to a threshold crossing of said second channel filtered and amplified signal, said threshold crossing being predetermined to reject ambiguous responses of said clock generator to said first channel filtered and amplified signal.

4. The system according to claim 1 wherein said second channel means further comprises:
    envelope detection means for demodulating said filtered and amplified signal, said envelope detection means being responsive to one of the $J_0$ and $J_1$ Bessel function term and to an incidental amplitude modulation term therein.

5. The system according to claim 1 wherein the radar comprises a transmitter and a receiver, the receiver further comprising:
    detector means for mixing a leakage signal from the transmitter with a radar return signal to produce the demodulated signal.

6. A method for sensing a predetermined altitude of a relatively small value comprising the steps of:
    transmitting a frequency modulated carrier signal to a target area;
    receiving a reflection of said transmitted signal;
    heterodyning said received signal with said transmitted signal to produce at least a $J_0$ and a $J_1$ Bessel function signal component thereof;
    separating said $J_0$ and said $J_1$ signals;
    amplifying said $J_0$ and $J_1$ signals in a first and a second channel, respectively;
    holding a peak of said $J_1$ signal so that said peak of said $J_1$ signal may be compared to a peak of said $J_0$ signal;
    comparing said amplified $J_0$ and said amplified and held $J_1$ signals;
    sensing a predetermined amplitude difference between said $J_0$ and held $J_1$ signals; and
    signaling an output responsive to said sensed predetermined amplitude difference.

7. The method according to claim 6 wherein said amplifying step further comprises the step of:
    detecting the envelope of the $J_1$ signal by means of an incidental amplitude modulation signal present therewith.

* * * * *